Patented June 18, 1940

2,204,728

UNITED STATES PATENT OFFICE 2,204,728

STABILIZATION OF FOODS

Carleton Ellis, Montclair, and Frederic Dannerth, East Orange, N. J., assignors, by direct and mesne assignments, to Ellis Laboratories, Inc., Montclair, N. J.

No Drawing. Application December 14, 1937, Serial No. 179,724

7 Claims. (Cl. 99—150)

This invention relates to the prevention or inhibition of oxidative action on food products. It involves particularly the preparation of antioxidants to be employed in stabilizing food products against such oxidative action.

Oxidative action on foods, exposed to oxygen or oxygen-containing gases such as the air, results in the development of rancidity which may be accompanied or preceded by such undesirable effects as loss of flavor and/or nutrient value, the evolution of disagreeable odors, and eventually the food becoming unfit for consumption. Such undesirable transformations, brought about in whole or in part by oxidative action, result in the foods attaining a condition designated as rancid. Examples of substances which undergo such changes are lard (including those varieties derived from hog or beef fats and also from edible vegetable oils and fats), cod-liver oil, flour, shelled nuts, and the like.

We have found that oxidative action can be greatly retarded when the food product is coated, dusted, or otherwise incorporated with a small proportion of an antioxidant or oxidative inhibitor derived from unripe plants or fruits, as hereinafter described. The inhibitor may be applied directly to the material to be protected, as for example prints of butter. In other instances, it may be desirable to mix the inhibitor with a seasoning agent, say, sugar, salt, or spices and sprinkle the resulting mixture on the edible substance. An illustration of this mode of procedure is incorporating a small proportion of the oxidation preventative with confectioner's sugar, and sprinkling the resulting composition on cakes, pies, pastry, and the like.

By the term unripe fruit we mean one that has not attained full maturity or full ripeness. These two stages of immaturity and maturity (or unripeness and ripeness) can be recognized in many instances by the color of the fruit. Thus, an unripe or immature tomato is green and the ripe or matured tomato is red. However, there are many other distinguishing characteristics. For example, carbohydrate material is present in the unripe fruit mainly as starch and in the ripe fruit as sugars. Again, the immature fruit usually possesses a very substantial proportion of glucosides which may disappear wholly or to a large extent during the maturing process. Pectose, another constituent of immature fruits, is hydrolyzed during ripening to meta pectin, pectic acid, para pectic acid and other substances. We find that the chemical constituents (pectose, glucosides, pigments, enzymes, organic acids, starch and the like) of unripe or immature plants or fruits, exert a peculiar and unexpected protective action on food products derived from animals, as well as on oil-bearing plants and animal products, and on oils derived from plants or from animals.

Botanically, a fruit may be described as the ripened pistil which consists of a matured ovary wall (or pericarp) and one or more matured ovules (or seeds). Vegetables may be either fruits or seeds, as for example tomatoes or peas. Many vegetables may be utilized as food products while still immature or unripe. By the term fruit, however, we mean to include not only fruits and vegetables but also those edible non-fruity parts of plants, such as lettuce or spinach leaves, carrots and potatoes.

For the purpose of our invention, we may macerate the unripe plant or particular part thereof in such a way that it becomes a paste or cream to a greater or lesser degree. This is then dried at a temperature which preferably does not exceed 50° C. If desired, this latter step may be conducted under reduced or sub-atmospheric pressure, thereby hastening conversion of the paste or cream into a solid mass. Still another modification comprises heating the macerated fruit in the presence of an inert gas, e. g., nitrogen. The dried material can be powdered and added to the substance which is to be protected against oxidative influences. However, we do not limit ourselves to the use of the powdered plant product as we have observed that a paste consisting of water admixed with the unripe plant material is at least equally effective for inhibiting oxidative action.

Likewise we may macerate separately two or more unripe fruits and then admix the macerated masses in any desired proportions. Or, the unripe fruits or portions thereof may be admixed in any desired proportion and the composite mixture macerated. Also, the composition obtained by either of these procedures may, if desired, be dried at a temperature preferably not exceeding 50° C. Still another procedure comprises separately drying unripe fruits, at a temperature preferably not exceeding 50° C., grinding the dried masses to powders, and combining the latter in any desired proportions.

When the food product is a liquid, e. g., corn or cotton-seed oil, the inhibitor may be incorporated therewith by grinding, agitation, or any other suitable means. Afterwards the liquid is stored for a short time, say several hours, at a temperature preferably not over 50° C., and then decanted or filtered, for example, from solid portions readily discernible to the eye. In this manner we find that sufficient antioxidant is dissolved, dispersed or otherwise incorporated to protect the food for considerable periods of exposure to the air or atmosphere.

We find that the unripe or immature fruit or plant, used in whole or in part, is most effective when employed at temperatures between 0° and 50° C., or thereabouts, and that it may gradually lose its effectiveness as the temperature rises above 50° C.

Although we do not wish to limit our invention to any particular type of unripe fruit or plant, nevertheless those plants or fruits which are generally classed as edible are most suitable for our purpose. Examples of such are apples, plums and tomatoes. One type which is particularly effective is the legumes, as for example, peas or beans. It will be seen that those plants which are flowering and seed-bearing, and which may be designated as Spermatophyta, are especially useful for our invention.

Furthermore, we wish to avoid utilization of the woody portion of any plant which bears fruit embraced within the scope of our invention. For example, inhibitors or antioxidants may be prepared from unripe or immature apples. On the other hand, we prefer not to use the trunk of the tree, or any woody portion thereof, in our composition.

Most effective prevention of oxidative action, according to our invention, is secured with inhibitors derived from unripe or immature plants or fruits, and only a small quantity of such inhibitor need be employed. In some instances, however, it may be desirable to incorporate with the antioxidant a minor proportion of an analogous agent obtained or derived from ripe or mature fruits or plants. In this manner some variation is possible in the color, taste, odor, or flavor of the composition made according to our invention.

It should be noted also that the antioxidants we employ may, in some instances, not only protect the food product from oxidative action but also improve, modify or alter such qualities as color, taste or odor or enhance vitamin content. The factors or qualities in a food which exert the strongest appeal to the user are probably odor and taste and their simultaneous effect may be designated as flavor. The combined action of our inhibitors or antioxidants to maintain or alter (i. e., modify or improve) any of the aforementioned qualities, but in particular the flavor, and thus enhance or increase the attractiveness or appeal of the food is also a part of our invention.

The following examples will serve to illustrate our invention.

*Example 1.*—Unripe peas were removed from their pods, and then ground to paste fine enough to pass through an 18-mesh screen. The inhibitor so prepared could be employed for the inhibition of oxidative action on food products.

*Example 2.*—Twenty-five parts of the inhibitor, as prepared in Example 1, were added to 100 parts of corn oil that was palatable and pleasant tasting. The mixture was stirred while kept at a temperature of 50° C. for two hours. At the end of this period the oil was subjected to a centrifuging operation to separate it from dispersed, solid material. The treated oil so obtained was stored in an open container for 7 days at a temperature of 50° C., and then for 6 days at a temperature of 70° C. After 13 days' storage at these elevated temperatures, rancidity tests on the oil indicated that oxidative action and development of rancidity had been effectually inhibited.

A sample of the untreated corn oil after being stored for the same length of time and under the same conditions gave very positive tests for rancidity.

*Example 3.*—Unripe cabbage leaves were chopped into a mass of small pieces and the mass heated to a temperature of 40° C. During the latter operation the pressure was reduced to 35–40 mm. of mercury. After sufficient dehydration had occurred, heating was stopped and the dehydrated mass was ground to a fine powder.

*Example 4.*—Unripe apples were cut into thin slices and these were subjected, at atmospheric pressure, to a temperature of 50° C. When sufficiently dried, the pomaceous material was finely ground.

*Example 5.*—One hundred parts of sweet cream butter were melted and 1 part of the dried pomaceous powder, described in Example 4, was incorporated. The molten mass was allowed to set by cooling, and then left exposed to the atmosphere at room temperature (about 70° F.) for 10 days. When tested at the end of this period of exposure, there was practically no evidence of development of rancidity. It was noted also that the butter had maintained a desirable and palatable flavor.

A sample of the sweet cream butter without any inhibitor added to it after subjection to the same exposure test gave evidence of marked rancidity development. Furthermore, the sample developed an undesirable and unpalatable flavor.

From the foregoing it will be seen that our invention involves preparation of an inhibitor of oxidative action on edible foods and comprises macerating unripe fruit and, if desired, drying said macerated mass at a temperature preferably not exceeding 50° C. It embodies, furthermore, the treatment of edible foods with said inhibitor whereby stabilization and protection of such food against oxidative action is secured. It also contemplates incorporation of such an inhibitor or antioxidant with a seasoning or flavoring agent before the latter is used with foods. Our invention also includes maintaining or altering, i. e., modifying, improving or enhancing, the flavor of food products by incorporation or addition of oxidation preventative.

It should be understood that by the term drying or dried, as used herein, we mean that the product is heated at a sufficiently high temperature (preferably not above 50° C.) for a period of time long enough to secure a mass which may be readily ground to a fine powder and then flows or pours easily. We do not wish to imply that, in all instances inhibitors made according to our invention must be completely anhydrous or entirely devoid of water (or other volatile matter). This condition of substantial or complete dehydration may be desirable in some cases and is, therefore, not precluded.

The quantity of antioxidant, made according to our invention, which may be required will vary considerably with the type of food product it is desired to protect, as some edible substances are much more sensitive to oxidative action than others. Again, the proportion of antioxidant employed will be determined to some extent by the length of time for which protection of the food is considered necessary. In most instances 0.1 to 10 per cent by weight of inhibitor will be sufficient, though we do not wish to be limited to these particular proportions.

What we claim is:

1. The process which comprises macerating substantially non-oleaginous unripe fruit of an edible plant of the dicotyledon group at a temperature below that at which inhibitors of oxidation in said fruit are deleteriously affected, and incorporating the resultant product with an edible food in an amount sufficient to stabilize the food substantially against oxidative action.

2. The process which comprises macerating substantially non-oleaginous unripe fruit of an edible plant of the dicotyledon group, heating said macerated product at a temperature not exceeding 50° C. to dry the same substantially, and incorporating the resultant product with an edible food in an amount sufficient to stabilize the food substantially against oxidative action.

3. The process which comprises heating an edible oil with a macerated non-oleaginous unripe fruit of an edible plant of the dicotyledon group at a temperature not exceeding 50° C. for a period sufficient to transfer inhibitors of oxidation to the oil, and separating the treated oil from the residual plant material whereby an oil is produced substantially protected against oxidation.

4. A food product subject to oxidative action which has been heated with a macerated non-oleaginous unripe fruit of an edible plant of the dicotyledon group at a temperature below that at which inhibitors of oxidation in said fruit is deleteriously effected in an amount sufficient to inhibit rancidity substantially.

5. A composition as set forth in claim 4 in which the unripe fruit is peas.

6. A composition as set forth in claim 4 in which the unripe fruit is cabbage.

7. A composition as set forth in claim 4 in which the unripe fruit is apple.

CARLETON ELLIS.
FREDERIC DANNERTH.